United States Patent
Lee et al.

(10) Patent No.: US 11,198,104 B2
(45) Date of Patent: Dec. 14, 2021

(54) DEVICE FOR COOLING SLURRY MANUFACTURING MIXER

(71) Applicant: Samsung SDI Co., Ltd., Yongin-si (KR)

(72) Inventors: Ho Seob Lee, Yongin-si (KR); Jee Sang Hwang, Yongin-si (KR); Jin Seo Park, Yongin-si (KR); So Il Moon, Yongin-si (KR); Ho Wn Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 324 days.

(21) Appl. No.: 16/308,939

(22) PCT Filed: Jul. 4, 2017

(86) PCT No.: PCT/KR2017/007122
§ 371 (c)(1),
(2) Date: Dec. 11, 2018

(87) PCT Pub. No.: WO2018/012790
PCT Pub. Date: Jan. 18, 2018

(65) Prior Publication Data
US 2019/0308150 A1  Oct. 10, 2019

(30) Foreign Application Priority Data
Jul. 12, 2016  (KR) .......................... 10-2016-0088095

(51) Int. Cl.
*B22C 5/00*  (2006.01)
*B01F 15/06*  (2006.01)
(Continued)

(52) U.S. Cl.
CPC .......... *B01F 15/065* (2013.01); *B01F 3/1221* (2013.01); *B01F 9/00* (2013.01);
(Continued)

(58) Field of Classification Search
CPC .............................. B01F 15/065; B01F 3/1221
See application file for complete search history.

(56) References Cited

U.S. PATENT DOCUMENTS

| | | | | |
|---|---|---|---|---|
| 3,623,998 A | * | 11/1971 | Bourne | ................... B01F 7/008 521/74 |
| 4,190,617 A | | 2/1980 | Hope et al. | |

(Continued)

FOREIGN PATENT DOCUMENTS

| | | |
|---|---|---|
| CN | 86103496 A | 4/1988 |
| CN | 203990405 U | 12/2014 |

(Continued)

OTHER PUBLICATIONS

Byeongman Jeong, "Structure for installing of thermometer measuring device in homo mixer", Oct. 7, 2009 (machine translation of description) (Year: 2009).*

(Continued)

*Primary Examiner* — Anshu Bhatia
*Assistant Examiner* — Gregory Y Huan
(74) *Attorney, Agent, or Firm* — Lewis Roca Rothgerber Christie LLP (57) ABSTRACT

A device for cooling a slurry manufacturing mixer-comprises: a rotation container that comprises a mixing part, which mixes slurry and has a temperature detection part, and a slurry discharge part, which is formed under the mixing part and has a discharge hole for discharging the slurry; a body that is positioned under the rotation container and has a through-hole formed therethrough, through which the rotation container is inserted; and a sealing member interposed between the rotation container and the body, wherein the mixing part comprises an inner container and an outer container, and a cooling water passage is formed between the inner container and the outer container.

14 Claims, 10 Drawing Sheets

(51) Int. Cl.
- *B01F 3/12* (2006.01)
- *B01F 9/10* (2006.01)
- *B01F 15/00* (2006.01)
- *G05D 7/06* (2006.01)
- *F16K 31/00* (2006.01)
- *B01F 9/00* (2006.01)
- *F16K 11/00* (2006.01)

(52) U.S. Cl.
CPC ............... *B01F 9/10* (2013.01); *B01F 15/00* (2013.01); *B01F 15/00175* (2013.01); *B01F 15/00396* (2013.01); *B01F 15/06* (2013.01); *F16K 11/00* (2013.01); *F16K 31/00* (2013.01); *G05D 7/0647* (2013.01); *B01F 2015/00084* (2013.01); *B01F 2015/061* (2013.01); *B01F 2215/0036* (2013.01)

(56) References Cited

U.S. PATENT DOCUMENTS

| | | | |
|---|---|---|---|
| 4,854,715 A | | 8/1989 | Eirich et al. |
| 5,141,328 A | * | 8/1992 | Dilley ................. B01F 7/00816 165/109.1 |
| 2011/0116339 A1 | | 5/2011 | Mittal |

FOREIGN PATENT DOCUMENTS

| | | | |
|---|---|---|---|
| CN | 204582986 U | | 8/2015 |
| JP | 5-76524 A | | 3/1993 |
| JP | 5-76525 A | | 3/1993 |
| JP | 2000-117083 A | | 4/2000 |
| JP | 2003-144896 A | | 5/2003 |
| JP | 2003144896 A | * | 5/2003 |
| JP | 2003-223888 A | | 8/2003 |
| JP | 2009-72746 A | | 4/2009 |
| JP | 4462894 B2 | | 2/2010 |
| JP | 2013-151621 A | | 8/2013 |
| JP | 5486186 B2 | | 2/2014 |
| KR | 1998-059468 U | | 10/1998 |
| KR | 20-2009-0010168 U | | 10/2009 |
| KR | 20090010168 U | * | 10/2009 |
| KR | 10-2011-0135623 A | | 12/2011 |
| KR | 20120095589 A | * | 8/2012 |
| KR | 10-1569523 B1 | | 11/2015 |
| WO | 0106857 A1 | | 2/2001 |
| WO | WO-0106857 A1 | * | 2/2001 ............ B01F 15/065 |

OTHER PUBLICATIONS

Saburo Morioka, "Drainage apparatus and kettle apparatus", May 20, 2003 (machine translation of description) (Year: 2003).*

Yoon Soon Gon, "Slot nozzle system", Aug. 29, 2012 (machine translation of description) (Year: 2012).*

Jean Louis Nussbaum, "Kneading trough with cooled or heating vat", Feb. 1, 2001 (Year: 2001).*

International Search Report for corresponding International Application No. PCT/KR2017/007122, dated Oct. 13, 2017, 3pp.

EPO Extended Search Report dated Feb. 12, 2020, for corresponding European Patent Application No. 17827864.4 (7 pages).

Chinese Office Action, with English translation, dated Nov. 3, 2020, issued in corresponding Chinese Patent Application No. 201780036213.1 (16 pages).

* cited by examiner

DEVICE FOR COOLING SLURRY MANUFACTURING MIXER

CROSS-REFERENCE TO RELATED APPLICATION(S)

This application is a National Phase Patent Application of International Patent Application Number PCT/KR2017/007122, filed on Jul. 4, 2017, which claims priority of Korean Patent Application No. 10-2016-0088095, filed Jul. 12, 2016. The entire contents of both of which are incorporated herein by reference.

TECHNICAL FIELD

The present invention relates to a device for cooling a slurry manufacturing mixer.

BACKGROUND ART

In general, a slurry manufacturing mixer is configured to rotate for mixing slurry. If the mixer rotates, heat generation occurs due to friction. Then, gelation or coagulation of the slurry is caused by the heat generation. To minimize the heat generation, a mixing time may be shortened and the RPM of a mixing part may be reduced, which may, however, make a mixing process insufficiently performed, resulting in degradation of the slurry. Thus, a device for cooling the mixer quickly is required.

DESCRIPTION OF THE INVENTION

Technical Problems to be Solved

The present invention provides a device for cooling a slurry manufacturing mixer, which can quickly cool a rotation container for manufacturing slurry and slurry contained therein.

Technical Solutions

In accordance with an aspect of the present invention, there is provided a device for cooling a slurry manufacturing mixer, the device comprising: a rotation container including a mixing part, which mixes slurry and has a temperature detection part, and a slurry discharge part, which is formed under the mixing part and has a discharge hole for discharging the slurry; a body positioned under the rotation container and having a through-hole, through which the rotation container is inserted; and a sealing member interposed between the rotation container and the body, wherein the mixing part comprises an inner container and an outer container, and a cooling water passage is formed between the inner container and the outer container.

The body may include a cooling water inlet hole for inducing cooling water and a cooling water discharge hole for discharging the cooling water.

The slurry discharge part may further include a cooling water inlet pipe and a cooling water discharge pipe, one end of the cooling water inlet pipe being formed at a position corresponding to the cooling water inlet hole and the other end of the cooling water inlet pipe being connected to a bottom surface of the outer container, and one end of the cooling water discharge pipe being formed at a position corresponding to the cooling water discharge hole and the other end of the cooling water discharge pipe being connected to the bottom surface of the outer container.

A straw-shaped outlet pipe may further be formed at one side of the cooling water passage to discharge cooling water used to cool the rotation container, the outlet pipe being connected to the cooling water discharge pipe.

The sealing member may be formed between the slurry discharge part and the body and may include a first sealing member, a second sealing member and a third sealing member, the cooling water inlet hole may be positioned between the first sealing member and the second sealing member, and the cooling water discharge hole may be positioned between the second sealing member and the third sealing member.

The device may further include a valve including an inlet valve, which is connected to the cooling water inlet hole, and a discharge valve, which is connected to the cooling water discharge hole; and a control part controlling the valve, wherein when a temperature of the rotation container, as measured in the temperature detection part, is higher than a reference temperature, the control part controls the valve to supply cooling water to the cooling water passage.

The inlet valve may include a first port, which is supplied with cooling water, a second port, which is connected to the cooling water inlet hole, and a third port, which is connected to an external discharge hole, and the discharge valve may include a first port, which is supplied with air, a second port, which is connected to the cooling water discharge hole, and a third port, which is connected to an external discharge hole.

When the temperature of the rotation container is higher than the reference temperature, the control part may open the first and second ports of the inlet valve while closing the third port of the inlet valve, and may close the first port of the discharge valve while opening the second and third ports of the discharge valve.

When the temperature of the rotation container is lower than the reference temperature, the control part may open the first and second ports of the discharge valve while closing the third port of the discharge valve, and may close the first port of the inlet valve while opening the second and third ports of the inlet valve.

A drain hole for draining the cooling water to the outside may further be formed at a lower portion of the body.

A plurality of barriers may be formed on a bottom surface of the mixing part between the outer container and the inner container.

A plurality of posts may be formed on a bottom surface of the mixing part between the outer container and the inner container.

Advantageous Effects

In the device for cooling a slurry manufacturing mixer according to an embodiment of the present invention, a cooling water passage is formed between an inner container and an outer container, and a rotatable rotation container capable of rotating is provided, and cooling water is supplied to the cooling water passage, thereby quickly cooling the rotation container and slurry.

In addition, in the device for cooling a slurry manufacturing mixer according to an embodiment of the present invention, a rotatable rotation container is coupled to a through-hole of a body that is not rotated, and a sealing member is interposed between the body and the rotation container, thereby preventing the cooling water induced into the body from leaking out.

BEST MODE FOR CARRYING OUT THE INVENTION

Example embodiments will now be described more fully hereinafter with reference to the accompanying drawings; however, they provided so that this disclosure will be thorough and complete, and will fully convey exemplary implementations to those skilled in the art.

Figure 1:
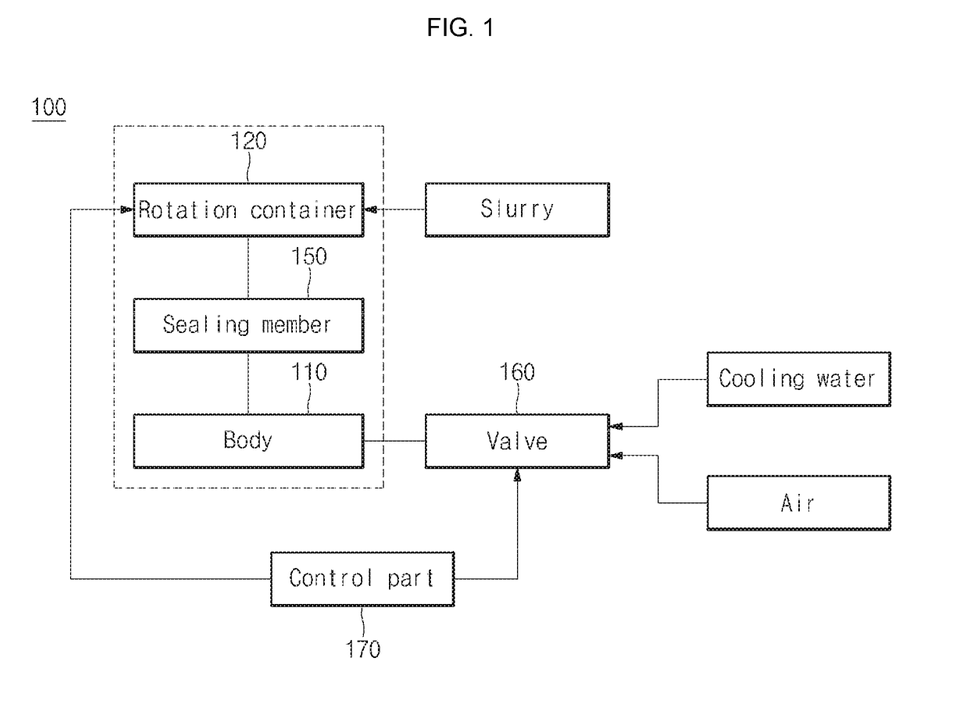
FIG. 1 is a block diagram illustrating a device for cooling a slurry manufacturing mixer according to an embodiment of the present invention.
Figure 2:
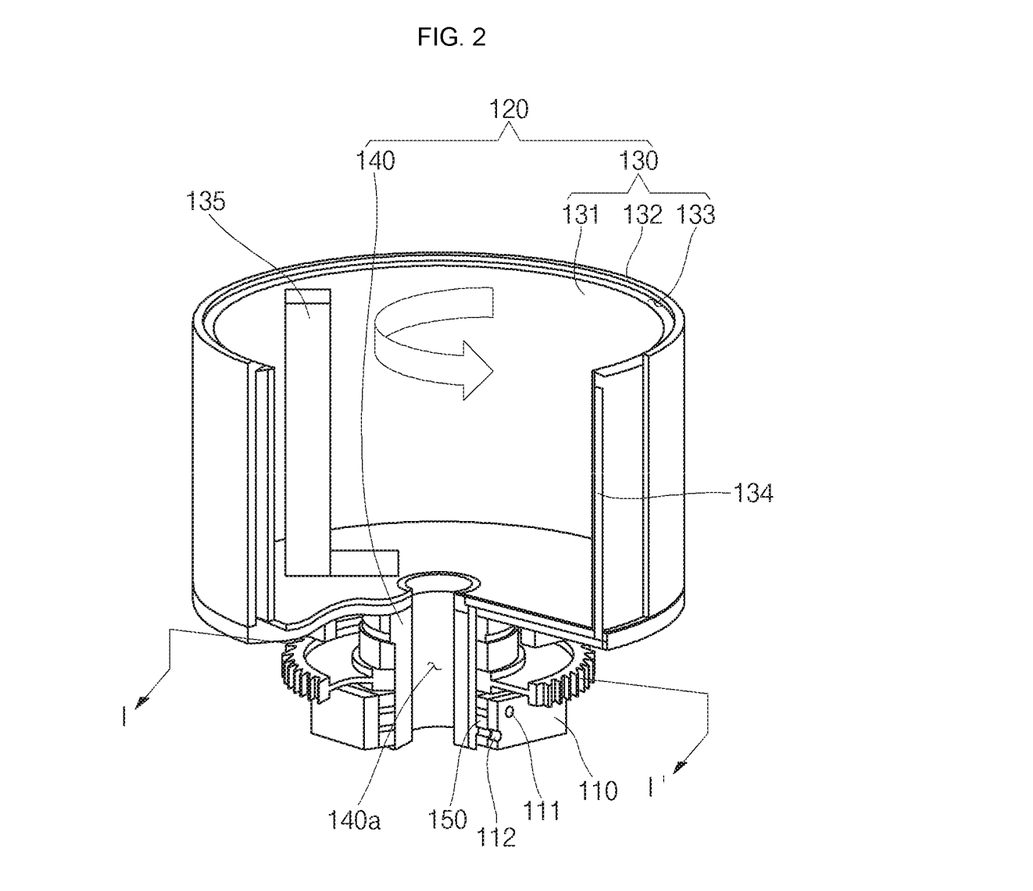
FIGS. 2 and 3 are perspective view illustrating the device for cooling a slurry manufacturing mixer according to an embodiment of the present invention.
Figure 3:
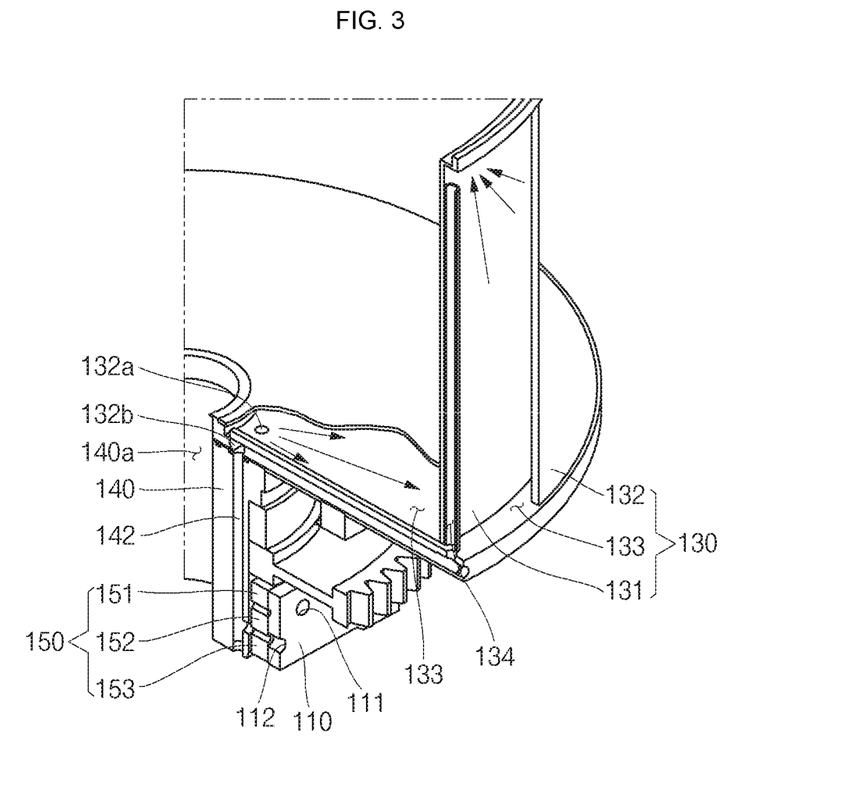
Figure 4:
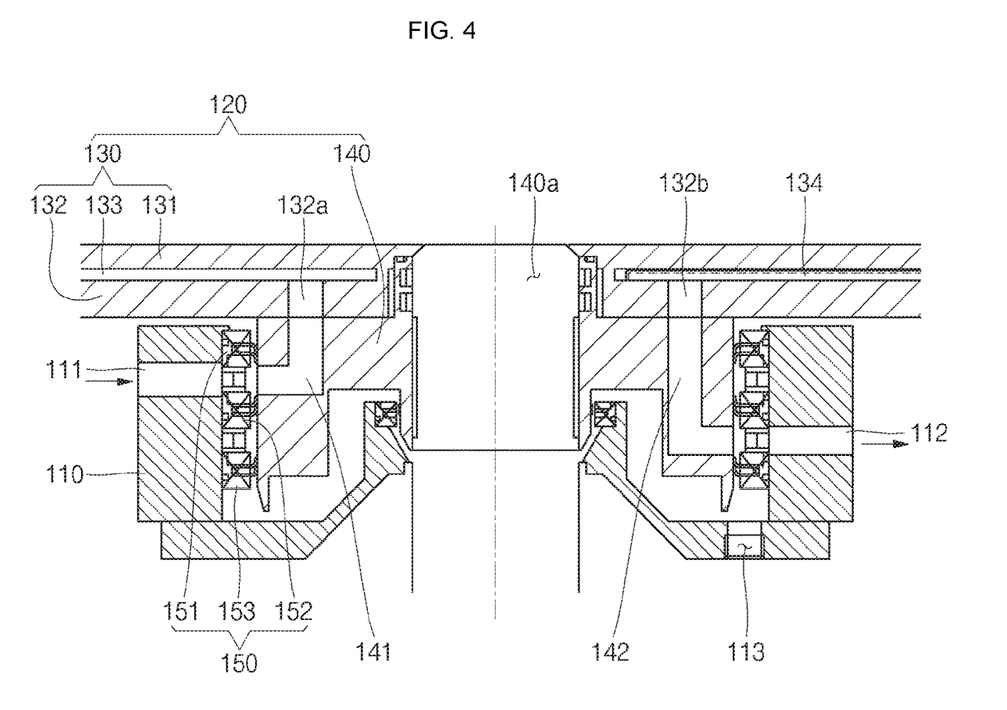
FIG. 4 is a cross-sectional view taken along the line I-I' of FIG. 2.
Figure 5A:
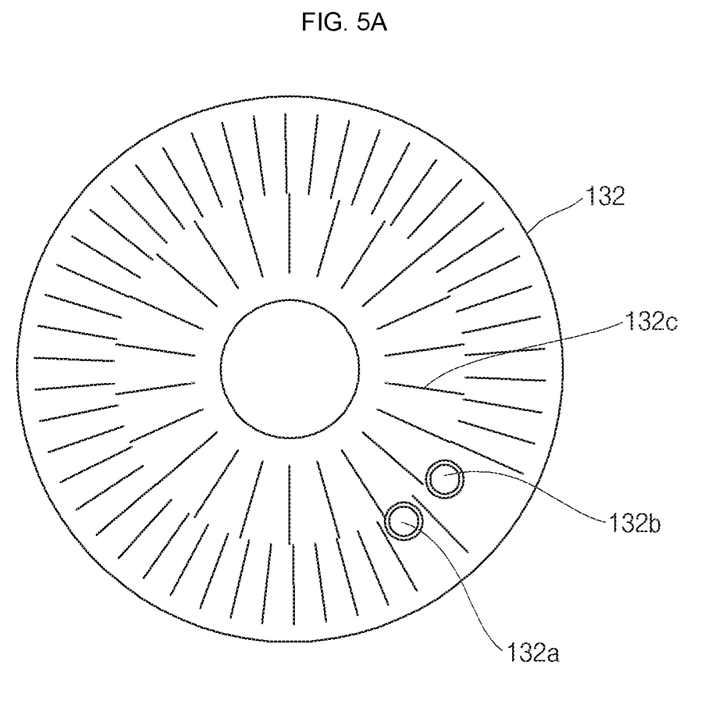
FIGS. 5A and 5B are a plan view and a cross-sectional view illustrating another embodiment of an outer container.
Figure 5B:
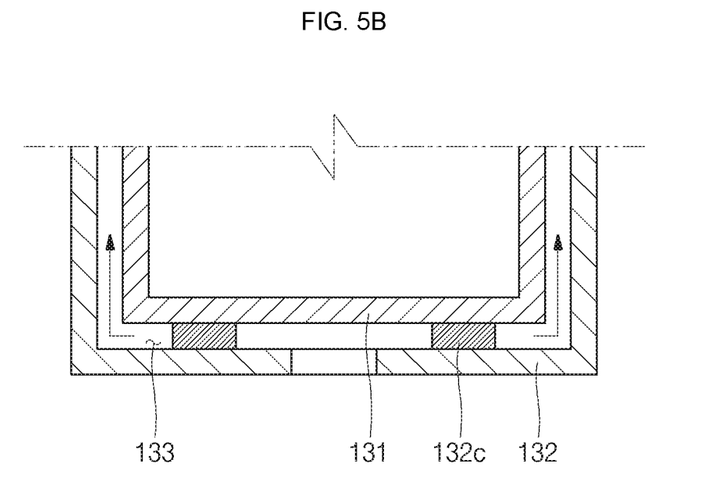
Figure 6A:
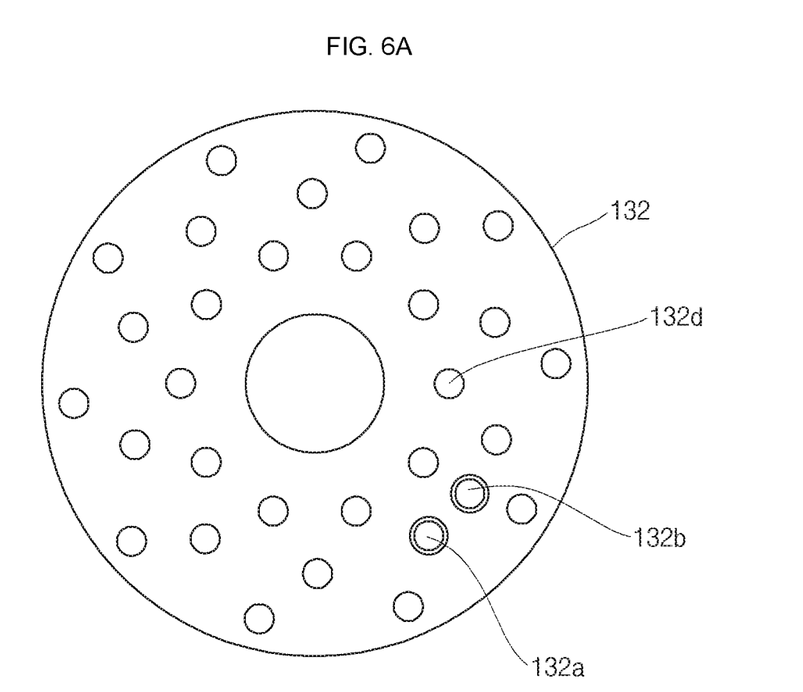
FIGS. 6A and 6B are a plan view and a cross-sectional view illustrating still another embodiment of an outer container.
Figure 6B:
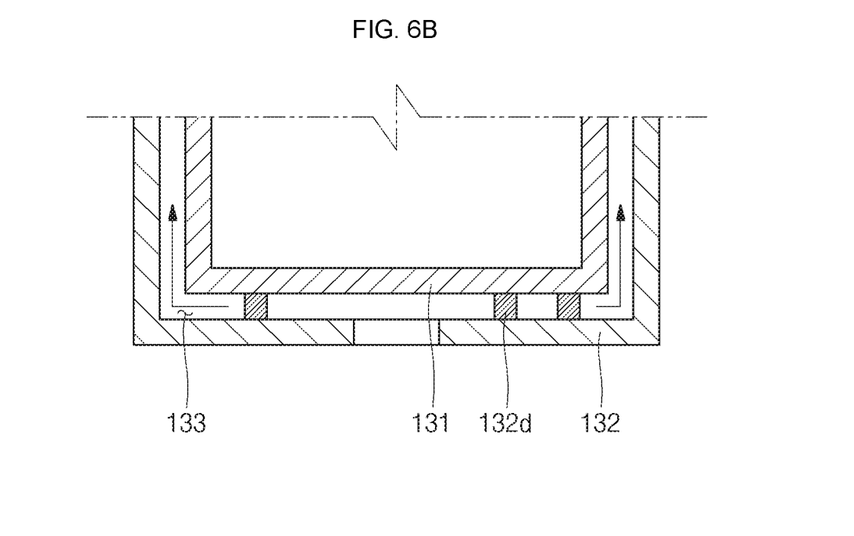
Figure 7:
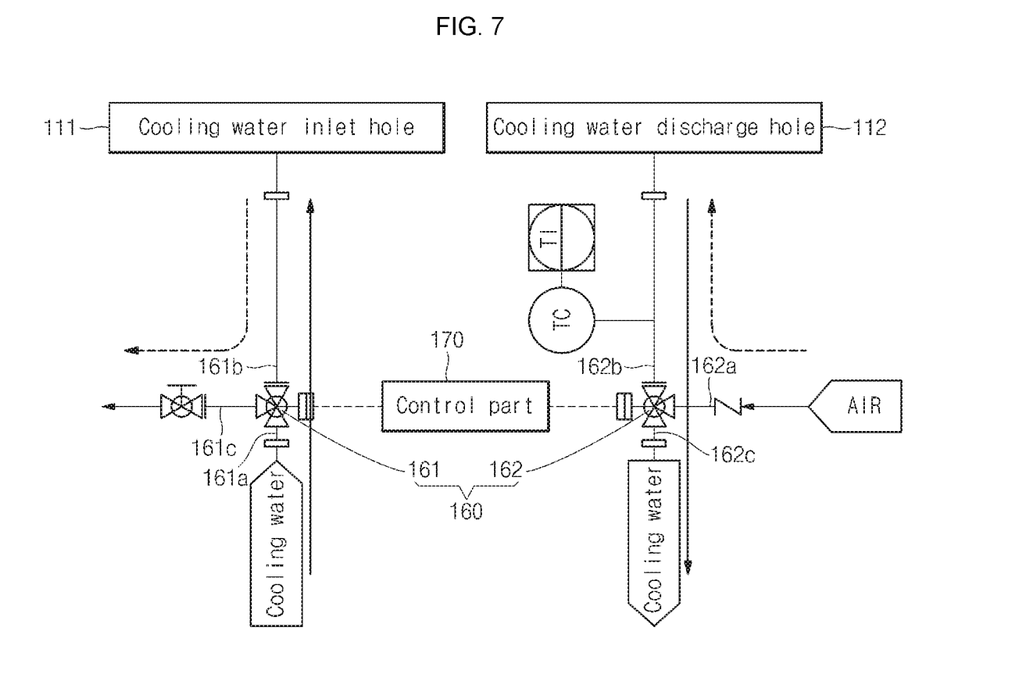
FIG. 7 is a schematic diagram illustrating configurations of a controller and a valve.

FIG. 1 is a block diagram illustrating a device for cooling a slurry manufacturing mixer according to an embodiment of the present invention. FIGS. 2 and 3 are perspective view illustrating the device for cooling a slurry manufacturing mixer according to an embodiment of the present invention. FIG. 4 is a cross-sectional view taken along the line I-I' of FIG. 2. FIGS. 5A and 5B are a plan view and a cross-sectional view illustrating another embodiment of an outer container. FIGS. 6A and 6B are a plan view and a cross-sectional view illustrating still another embodiment of an outer container. FIG. 7 is a schematic diagram illustrating configurations of a controller and a valve.

Referring to FIGS. 1 to 4, the slurry manufacturing mixer cooling device 100 according to the present invention includes a body 110, a rotation container 120, a sealing member 150, a valve 160 and a control part 170. The present invention relates to the mixer cooling device 100 for cooling slurry used in a secondary battery. Here, the rotation container 120 itself may be referred to as a mixer. Alternatively, the body 110, the rotation container 120 and the sealing member 150 may be collectively referred to as a mixer.

The body 110 is shaped of a cylinder having a through-hole formed therein. The rotation container 120 is inserted into the through-hole. The body 110 supports the rotation container 120, and is not rotated. In addition, the body 110 supplies cooling water to the rotation container 120.

The body 110 includes a cooling water inlet hole 111, a cooling water discharge hole 112 and a drain hole 113. The cooling water inlet hole 111 is formed on a side surface of the body 110. The cooling water supplied to the rotation container 120 is induced into the cooling water inlet hole 111. A hose may be connected to the cooling water inlet hole 111 for supplying cooling water. In addition, the cooling water discharge hole 112 is formed on the side surface of the body 110 and is positioned lower than the cooling water inlet hole 111. The cooling water used to cool the rotation container 120 is discharged through the cooling water discharge hole 112. Here, a hose may be connected to the cooling water discharge hole 112 so as to discharge the cooling water. The drain hole 113 is formed on a bottom surface of the body 110. The drain hole 113 is a hole for draining the cooling water leaking out between the body 110 and the rotation container 120.

The rotation container 120 is coupled to the through-hole of the body 110. In detail, the rotation container 120 includes a mixing part 130 and a slurry discharge part 140. The rotation container 120 functions to produce slurry by mixing materials input thereto while rotating.

The mixing part 130 has a substantially cylindrical shape and materials for manufacturing slurry are input to the mixing part 130. The mixing part 130 is formed to have a larger diameter than the body 110. The slurry discharge part 140 is formed at a lower portion of the mixing part 130 and has a discharge hole 140a formed at its center so as to discharge the slurry mixed in the mixing part 130. In addition, the slurry discharge part 140 is formed at the center of the mixing part 130 and is coupled to the through-hole of the body 110. Therefore, the slurry discharge part 140 is formed to have a smaller diameter than the through-hole.

The slurry discharge part 140 includes a cooling water inlet pipe 141 and a cooling water discharge pipe 142. The cooling water inlet pipe 141 is formed to have a substantially L-letter shape. That is to say, one side of the cooling water inlet pipe 141 is formed at a position corresponding to the cooling water inlet hole 111 of the body 110 and the other side of the cooling water inlet pipe 141 is upwardly extended to be connected to a bottom surface of the rotation container 120. The cooling water discharge pipe 142 is formed to have a substantially L-letter shape. That is to say, one side of the cooling water discharge pipe 142 is formed at a position corresponding to the cooling water discharge hole 112 of the body 110 and the other side of the cooling water discharge pipe 142 is upwardly extended to be connected to the bottom surface of the rotation container 120. Here, the cooling water inlet pipe 141 and the cooling water discharge pipe 142 are formed such that their passages do not overlap each other.

The mixing part 130 includes an inner container 131 and an outer container 132, and a cooling water passage 133 is formed on its bottom and side surfaces between the inner container 131 and the outer container 132. That is to say, a gap is created between the inner container 131 and the outer container 132, and the gap corresponds to the cooling water passage 133 to allow the cooling water to flow therein. The cooling water passage 133 is entirely formed on the bottom and side surfaces of the mixing part 130. Therefore, the cooling water cools the rotation container 120 while flowing through the cooling water passage 133. Accordingly, the temperature of the slurry existing inside the rotation container 120 may also be lowered. In addition, an outlet pipe 134 is formed at one side of the cooling water passage 133. The outlet pipe 134 is extended from the side surface to the bottom surface of the mixing part 130 to then be connected to the cooling water discharge pipe 142. A top end of the outlet pipe 134 is formed to be lower than a top end of the side surface of the mixing part 130. Therefore, the cooling water that flows through the cooling water passage 133 is induced into the top end of the outlet pipe 134 and is discharged to the cooling water discharge pipe 142. In addition, the outlet pipe 134 is shaped of a straw, and the cooling water that flows through the cooling water passage 133 sufficiently cools the rotation container 120 to then be slowly discharged.

On a bottom surface of the outer container 132 are formed a first hole 132a connected to the cooling water inlet pipe 141 of the slurry discharge part 140 and a second hole 132b connected to the cooling water discharge pipe 142 of the slurry discharge part 140. The first hole 132a is connected to the cooling water passage 133 and the second hole 132b is connected to the outlet pipe 134.

As illustrated in FIGS. 5A and 5B, a plurality of barriers 132c may be formed on the bottom surface of the outer container 132. The plurality of barriers 132c are formed to be spaced a predetermined distance apart from each other. The barriers 132c allow the cooling water induced through the first hole 132a to evenly flow throughout the entire bottom surface of the outer container 132. In addition, the barriers 132c are positioned between the outer container 132 and the inner container 131 and serve to support the inner container 131. That is to say, since the cooling water passage 133 is formed on the entire bottom surface between the outer container 132 and the inner container 131, the inner container 131 may be supported with a force gradually decreasing away from the center of the bottom surface of the rotation container 120, resulting in downwardly sagging of the inner container 131. In the present invention, however, the inner container 131 can be securely supported by forming the barriers 132c on the bottom surface of the outer container 132.

In addition, as illustrated in FIGS. 6A and 6B, a plurality of posts 132d may be formed on the bottom surface of the outer container 132. The plurality of posts 132d are formed to be spaced a predetermined distance apart from each other. The posts 132d allow the cooling water induced through the first hole 132a to evenly flow throughout the entire bottom surface of the outer container 132. In addition, the posts 132d are positioned between the outer container 132 and the inner container 131 and serve to support the inner container 131.

Additionally, a temperature detection part 135 is formed inside the mixing part 130. The temperature detection part 135 measures temperatures of the slurry existing in the rotation container 120 and the rotation container 120 to then transfer the measured temperatures to the control part 170. The temperature detection part 135 may be, for example, a thermocouple thermometer, but not limited thereto.

The sealing member 150 is positioned between the body 110 and the rotation container 120. In detail, the sealing member 150 is positioned between the body 110 and the slurry discharge part 140. In addition, the sealing member 150 is formed between the body 110 and the slurry discharge part 140 in a ring shape. For example, the sealing member 150 may be formed in a lip seal shape. Therefore, the sealing member 150 may reduce friction between rotation container 120 and the sealing member 150 when the rotation container 120 rotates. The sealing member 150 includes a first sealing member 151, a second sealing member 152 and a third sealing member 153 sequentially disposed from an upper portion. The cooling water inlet hole 111 of the body 110 is positioned between the first sealing member 151 and the second sealing member 152, and the cooling water discharge hole 112 of the body 110 is positioned between the second sealing member 152 and the third sealing member 153. Therefore, the cooling water induced to the cooling water inlet hole 111 is sealed by the first sealing member 151 and the second sealing member 152 and exists in a ring shape between the body 110 and the slurry discharge part 140.

Therefore, even when the slurry discharge part 140 of the rotation container 120 rotates, the cooling water can be induced to the cooling water inlet pipe 141. In addition, the cooling water discharged to the cooling water discharge pipe 142 of the slurry discharge part 140 is closed by the second sealing member 152 and the third sealing member 153. The cooling water existing between the second sealing member 152 and the third sealing member 153 is discharged to the outside through the cooling water discharge hole 112. The sealing member 150 prevents the cooling water from leaking out between the body 110 and the rotation container 120. However, when the cooling water happens to leak out, the cooling water is discharged to the drain hole 113 formed in the body 110, thereby preventing the cooling water from being induced into the rotation container 120. While the sealing member 150 consisting of three sealing members is illustrated in the present invention, three or more sealing members may be provided to improve sealing capacity of the sealing member 150.

The valve 160 is connected to the body 110 and is opened or closed according to the supply of the cooling water and/or air. Referring to FIG. 7, the valve 160 includes an inlet valve 161 connected to the cooling water inlet hole 111 and a discharge valve 162 connected to the cooling water discharge hole 112.

The inlet valve 161 may be a 3-way valve. The inlet valve 161 includes a first port 161a connected to cooling water, a second port 161b connected to the cooling water inlet hole 111 and a third port 161c connected to an external discharge hole. When the cooling water is supplied to the body 110, the inlet valve 161 opens the first port 161a and the second port 161b while closing the third port 161c. In addition, when air is discharged from the body 110, the inlet valve 161 closes the first port 161a while opening the second port 161b and the third port 161c.

The discharge valve 162 may be a 3-way valve. The discharge valve 162 includes a first port 162a connected to air, a second port 162b connected to the cooling water discharge hole 112 and a third port 162c connected to an external discharge hole. When the cooling water is discharged to the outside, the discharge valve 162 closes the first port 162a while opening the second port 162b and the third port 162c. In addition, when the cooling water remaining in the cooling water passage 133 is discharged to the outside by supplying the air to the body 110, the discharge valve 162 opens the first port 162a and the second port 162b while closing the third port 162c.

The control part 170 is connected to the rotation container 120, the body 110 and the valve 160 to control these elements. In detail, when the temperature of the slurry, as measured by the temperature detection part 135, becomes higher than a reference temperature, the control part 170 controls the valve 160 to supply cooling water. Here, the control part 170 controls the inlet valve 161 to open the first port 161a and the second port 161b of the inlet valve 161 and to close the third port 161c of the inlet valve 161. In addition, the control part 170 controls the discharge valve 162 to close the first port 162a of the discharge valve 162 and to open the second port 162b and the third port 162c of the discharge valve 162. Accordingly, as illustrated in FIG. 5, the cooling water flows from the first port 161a to the second port 161b of the inlet valve 161 to then be induced to the cooling water inlet hole 111, and the cooling water used to cool the slurry flows from the cooling water discharge hole 112 to the second port 162b and the third port 162c of the discharge valve 162 to then be discharged to the outside.

In addition, when the temperature of the slurry becomes lower than the reference temperature, the control part 170 controls the inlet valve 161 not to supply the cooling water and allows the air to be supplied to remove the cooling water existing in the body 110 and the rotation container 120. Here, the control part 170 controls the discharge valve 162 to open the first port 162a and the second port 162b of the discharge valve 162 and to close the third port 162c of the discharge valve 162. In addition, the control part 170 controls the inlet valve 161 to close the first port 161a of the inlet valve 161 and to open the second port 161b and the third port 161c of the inlet valve 161. Accordingly, as illustrated in FIG. 7, the air flows from the first port 162a to the second port 162b of the discharge valve 162 to then be induced to the cooling water discharge hole 112, and the cooling water remaining in the body 110 and the rotation container 120 is discharged from the cooling water inlet hole 111 to the outside through the second port 161b and the third port 161c of the inlet valve 161.

With this configuration, the cooling water flows along the following path, which will now be described. The cooling water is induced to the cooling water inlet hole 111 of the body 110 and passes by the cooling water inlet pipe 141 of the slurry discharge part 140 to then flow into the cooling water passage 133 through the first hole 132a of the outer container 132. The cooling water cools the rotation container 120 and the slurry while moving from the bottom surface to the side surface of the outer container 132. Then, the cooling water flows to the outlet pipe 134 formed at one side of the cooling water passage 133 and moves to the cooling water discharge pipe 142 of the slurry discharge part 140 through the second hole 132b of the outer container 132 to then be discharged to the cooling water discharge hole 112 of the body 110.

As described above, in the slurry manufacturing mixer cooling device 100 according to the present invention, the cooling water passage 133 is formed between the inner container 131 and the outer container 132, and the rotation container 120 capable of rotating is provided, and the cooling water is supplied through the cooling water passage 133, thereby quickly cooling the rotation container 120 and the slurry.

In addition, in the slurry manufacturing mixer cooling device 100 according to the present invention, the rotatable rotation container 120 is coupled to the through-hole of the body 110, which is not rotated, and the sealing member 150 is interposed between the body 110 and the rotation container 120, thereby preventing the cooling water induced to the body 110 from leaking out.

Figure 8:
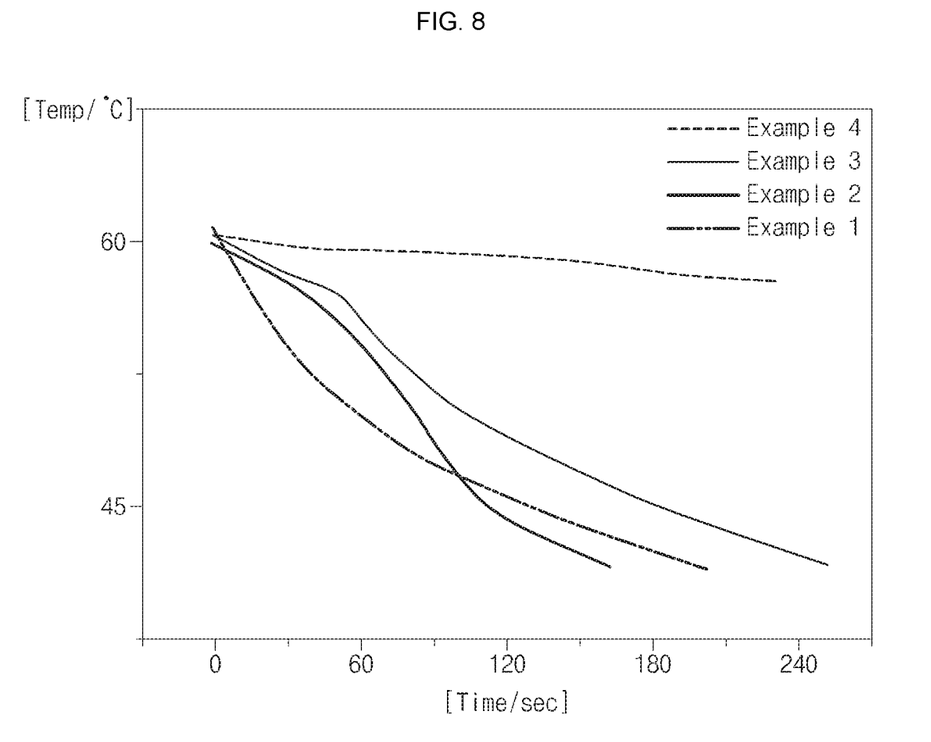
FIG. 8 is a graph for comparing time-dependent temperatures of a rotation container after mixing slurry.

FIG. 8 is a graph for comparing time-dependent temperatures of a rotation container after mixing slurry.

Here, Examples 1, 2 and 3 show examples in each of which the cooling device according to the present invention is applied, and Example 4 shows an example in which the cooling device according to the present invention is not applied. In Examples 1, 2 and 3, as illustrated in FIG. 8, the temperature of the rotation container is cooled from 60° C. to 45° C. or below within 4 minutes (240 seconds). In Example 4, however, the temperature of the rotation container is still maintained around 60° C. even after the lapse of 4 minutes. It is also confirmed that approximately 30 minutes is taken to sufficiently cool the rotation container in Example 4. That is to say, the slurry manufacturing mixer cooling device according to the present invention can quickly cool the rotation container.

Figure 9:
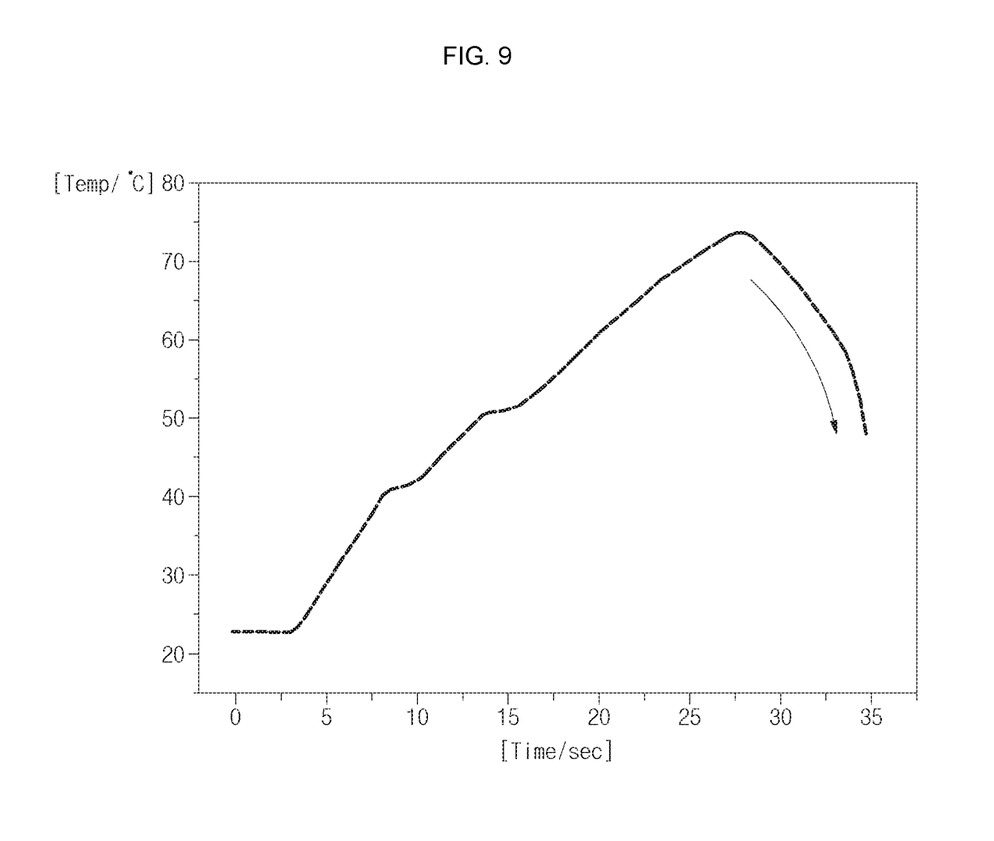
FIG. 9 is a graphical representation of slurry temperatures varying over time during mixing of slurry in a device for cooling a slurry manufacturing mixer.

FIG. 9 is a graphical representation of slurry temperatures varying over time during mixing of slurry in a device for cooling a slurry manufacturing mixer.

As illustrated in FIG. 9, when the slurry temperature reaches approximately 75° C. during mixing of the slurry, the cooling water is quickly supplied to then cool the slurry down to 50° C. or below within approximately 10 seconds. Here, it is noted that the slurry manufacturing mixer cooling device is set to be in a state in which the slurry temperature is maintained at 75° C. or below, which is because gelation of the slurry is caused due to coagulation of a conductive agent when the slurry temperature is 75° C. or above, making it difficult to manufacture the slurry.

Figure 10:
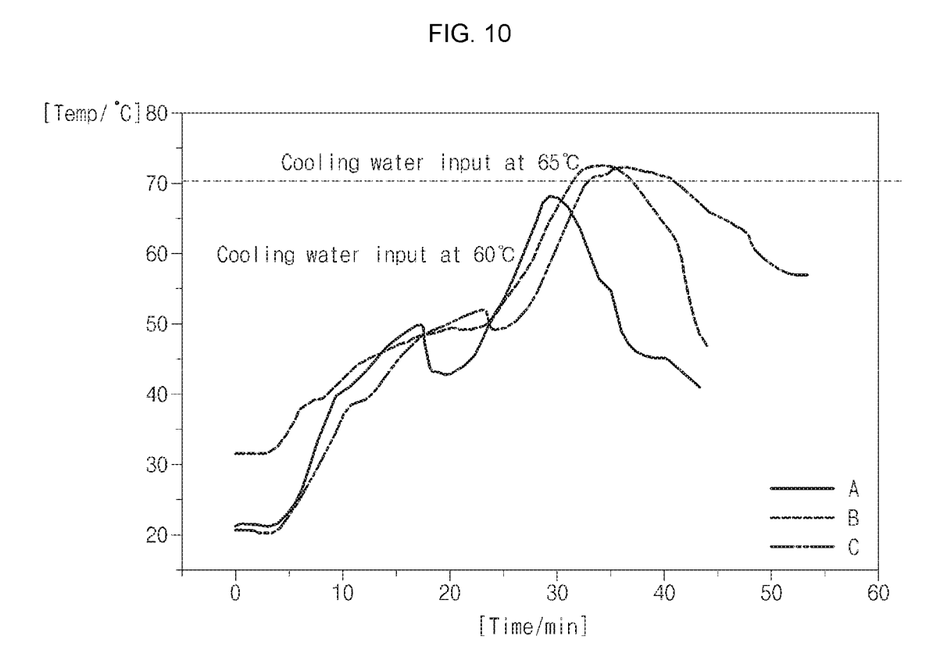
FIG. 10 is a graphical representation of changes in slurry temperatures according to the cooling water input time.

FIG. 10 is a graphical representation of changes in slurry temperatures according to the cooling water input time.

Here, A depicts that the cooling water is input when the slurry temperature is 60° C., and B and C represent that the cooling water is input when the slurry temperature is 65° C.

As illustrated in FIG. 10, in a case where the cooling water is input when the slurry temperature is 60° C., the slurry temperature is maintained at 70° C. or below, and in a case where the cooling water is input when the slurry temperature is 65° C., the slurry temperature rises up to 72° C. to then be cooled. That is to say, in order to manufacture high-quality slurry without occurrence of gelation, it is preferable to set the cooling water input time to a point in time at which the slurry temperature is 60° C.

Although the foregoing embodiments have been described to practice the slurry manufacturing mixer cooling device of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A device for cooling a slurry manufacturing mixer, the device comprising:
   a rotation container including a mixing part, which is to mix slurry and has a temperature detection part, and a slurry discharge part, which is formed under the mixing part and has a discharge hole for discharging the slurry;
   a body, which is configured to not rotate, positioned under the rotation container and having a through-hole, through which the rotation container is inserted; and
   a sealing member interposed between the rotation container and the body,
   wherein the mixing part comprises an inner container and an outer container, and a cooling water passage is formed between the inner container and the outer container, and
   wherein the body includes a cooling water inlet hole for inducing cooling water and/or a cooling water discharge hole for discharging the cooling water, and
   wherein the sealing member surrounds the slurry discharge part and has a ring shape.

2. The device of claim 1, wherein the body includes each of the cooling water inlet hole and the cooling water discharge hole.

3. The device of claim 2, wherein the slurry discharge part further includes a cooling water inlet pipe and a cooling water discharge pipe, one end of the cooling water inlet pipe being formed at a position corresponding to the cooling water inlet hole and another end of the cooling water inlet pipe being connected to a bottom surface of the outer container, and one end of the cooling water discharge pipe being formed at a position corresponding to the cooling water discharge hole and another end of the cooling water discharge pipe being connected to the bottom surface of the outer container.

4. The device of claim 3, wherein a straw-shaped outlet pipe is further formed at one side of the cooling water passage to discharge cooling water used to cool the rotation container, the outlet pipe being connected to the cooling water discharge pipe.

5. The device of claim 2, wherein the sealing member is formed between the slurry discharge part and the body and includes a first sealing member, a second sealing member and a third sealing member, the cooling water inlet hole is positioned between the first sealing member and the second sealing member, and the cooling water discharge hole is positioned between the second sealing member and the third sealing member.

6. The device of claim 2, further comprising a valve including an inlet valve, which is connected to the cooling water inlet hole, and a discharge valve, which is connected to the cooling water discharge hole; and a control part connected to the valve and to receive a temperature measurement from the temperature detection part and to control the valve, wherein when a temperature of the rotation container, as measured in the temperature detection part, is higher than a reference temperature, the control part is to control the valve to supply cooling water to the cooling water passage.

7. The device of claim 6, wherein the inlet valve includes a first port, which is to be supplied with cooling water, a second port, which is connected to the cooling water inlet hole, and a third port, which is connected to a first external discharge hole, and the discharge valve includes a first port, which is to be supplied with air, a second port, which is connected to the cooling water discharge hole, and a third port, which is connected to a second external discharge hole.

8. The device of claim 7, wherein when the temperature of the rotation container is higher than the reference temperature, the control part is to open the first and second ports of the inlet valve while closing the third port of the inlet valve, and is to close the first port of the discharge valve while opening the second and third ports of the discharge valve.

9. The device of claim 7, wherein when the temperature of the rotation container is lower than the reference temperature, the control part is to open the first and second ports of the discharge valve while closing the third port of the discharge valve, and is to close the first port of the inlet valve while opening the second and third ports of the inlet valve.

10. The device of claim 1, wherein a drain hole for draining cooling water to the outside is further formed at a lower portion of the body.

11. The device of claim 1, wherein a plurality of barriers are formed on a bottom surface of the mixing part between the outer container and the inner container.

12. The device of claim 1, wherein a plurality of posts are formed on a bottom surface of the mixing part between the outer container and the inner container.

13. A device for cooling a slurry manufacturing mixer, the device comprising:
a rotation container including a mixing part, which is to mix slurry and has a temperature detection part, and a slurry discharge part, which is formed under the mixing part and has a discharge hole for discharging the slurry;
a body, which is configured to not rotate, positioned under the rotation container and having a through-hole, through which the rotation container is inserted; and
a sealing member interposed between the rotation container and the body,
wherein the mixing part comprises an inner container and an outer container, and a cooling water passage is formed between the inner container and the outer container, and
wherein the body includes a cooling water inlet hole for inducing cooling water and/or a cooling water discharge hole for discharging the cooling water, and
wherein the sealing member contacts each of the body and the slurry discharge part.

14. A device for cooling a slurry manufacturing mixer, the device comprising:
a rotation container including a mixing part, which is to mix slurry and has a temperature detection part, and a slurry discharge part, which is formed under the mixing part and has a discharge hole for discharging the slurry;
a body, which is configured to not rotate, positioned under the rotation container and having a through-hole, through which the rotation container is inserted; and
a sealing member interposed between the rotation container and the body,
wherein the mixing part comprises an inner container and an outer container, and a cooling water passage is formed between the inner container and the outer container,
wherein the body includes a cooling water inlet hole for inducing cooling water and/or a cooling water discharge hole for discharging the cooling water, and
wherein the body includes the cooling water inlet hole, and
wherein the sealing member is to form a passageway for the cooling water between the cooling water inlet hole and the cooling water passage.

* * * * *